United States Patent [19]

Barberis

[11] Patent Number: 4,904,511
[45] Date of Patent: Feb. 27, 1990

[54] PREFORMED ELEMENT FOR THE INTERIOR TRIM OF MOTOR CARS AND A METHOD FOR ITS MANUFACTURE

[75] Inventor: Franco Barberis, Moncalieri, Italy

[73] Assignee: Fiat Auto S.p.A., Turin, Italy

[21] Appl. No.: 178,407

[22] Filed: Apr. 6, 1988

[30] Foreign Application Priority Data

Apr. 7, 1987 [IT]  Italy ................ 67286 A/87

[51] Int. Cl.⁴ .............................................. B32B 3/30
[52] U.S. Cl. .................................. 428/133; 156/297; 156/303.1; 428/542.8
[58] Field of Search .............. 446/88; 156/297, 303.1; 428/133, 542.8, 31

[56] References Cited

U.S. PATENT DOCUMENTS

| | | | |
|---|---|---|---|
| 3,634,965 | 1/1972 | McAuley | 446/88 |
| 3,753,846 | 8/1973 | Trouilhet | 428/133 X |
| 4,361,614 | 11/1982 | Moffitt, Jr. | 428/133 X |
| 4,397,914 | 8/1983 | Miura et al. | 428/174 X |
| 4,398,984 | 8/1983 | Uchiyama et al. | 428/174 X |
| 4,455,338 | 6/1984 | Henne | 428/174 X |
| 4,781,956 | 11/1988 | Zimmermann et al. | 428/43 |

Primary Examiner—Henry F. Epstein
Attorney, Agent, or Firm—Pennie & Edmonds

[57] ABSTRACT

A preformed element for the interior trim of motor cars compises a shaped base of thermoplastic material produced by injection moulding and having openings, and flat panels carrying a soft covering and applied to the back face of the base in correspondance with the openings. The flat panels are fixed by hot deformation of integral retaining appendages projecting from the back face of the base, or by welding, gluing or similar means.

7 Claims, 3 Drawing Sheets

PREFORMED ELEMENT FOR THE INTERIOR TRIM OF MOTOR CARS AND A METHOD FOR ITS MANUFACTURE

BACKGROUND OF THE INVENTION

1. Field of the Invention

The present invention relates generally to interior trim elements for motor cars.

More particularly, the subject of the invention is a preformed element useable as a panel for covering the internal face of a door or for other parts of the interior trim of a motor car.

2. Description of the Prior Art

According to known techniques, these preformed elements are produced by the moulding of sheets of thermoplastic material (for example, polypropylene) to the outer face of which a soft covering is subsequently applied. This covering may be constituted by a single layer applied to the entire surface of the moulded sheet, or of layers of smaller dimensions applied to preselected regions of the sheet.

These known trim elements have the disadvantage of being fairly expensive, particularly because the way in which the soft covering is applied requires complex upholstery and finishing operations.

SUMMARY OF THE INVENTION

The object of the present invention is to produce a preformed interior trim element for motor cars which, compared to conventional trim elements, is simpler and cheaper to make, more readily adaptable to the functional and aesthetic requirements of use, and also has a lighter structure.

This object is achieved according to the invention by means of a preformed element for the interior trim of motor cars, characterised in that it comprises a shaped base of thermoplastics material produced by injection moulding and having at least one opening, and at least one flat panel carrying a soft covering and applied to the back face of the base in correspondence with the or a respective opening.

The base is preferably provided with integral retaining appendages projecting from its back face in the region of the or each opening and serving for the fixing of the or each panel by means of hot deformation. Alternatively, the or each panel may be fixed permanently to the base by gluing, welding or equivalent means.

The or each panel conveniently comprises a rigid substrate forming a peripheral flange for bearing against the edge of the or the respective opening and to which the covering is fixed so as to project through the opening relative to the bearing flange.

The preformed element according to the invention can be produced by simpler and cheaper operations than conventional trim elements, and has a lighter structure than the latter. Injection moulding of the base enables its shape to be adapted easily to the functional and aesthetic requirements of use, and the way in which the or each panel with its soft covering is fitted enables complex and laborious upholstery and final finishing operations to be avoided.

The method for the production of the preformed trim element according to the invention comprises the operations of:

forming a shaped base having at least one opening, by injection moulding of a thermoplastic material, producing at least one flat panel formed by a rigid substrate and by a soft covering applied to the substrate, fixing the or each flat panel to the back face of the base in correspondence with the or a respective opening so that the soft covering of the or each flat panel is disposed within the or the respective opening.

The base is conveniently formed with integral retaining appendages projecting from its back face in the region of the or each opening, and the substrate of the or each flat panel is produced with a peripheral flange which is disposed in bearing contact against the edge of the or the respective opening. The fixing of the or each flat panel is carried out by hot deformation of the appendages against the flange.

Alternatively, the fixing may be effected by gluing, welding or equivalent means.

The preformed element according to the invention is useable to advantage both for the production of internal door-covering panels, and for the production of other parts of the interior trim of the passenger compartments of cars.

BRIEF DESCRIPTION OF THE DRAWINGS

The invention will now be described in detail with reference to the appended drawings, provided purely by way of non-limiting example, in which:

FIG. 4 is a longitudinal section taken on the line IV—IV of FIG. 2, and FIGS. 5 and 6 are two cross-sections taken respectively on the lines V—V and VI—VI of FIG. 2.

DETAILED DESCRIPTION OF THE PREFERRED EMBODIMENTS

Figure 1:
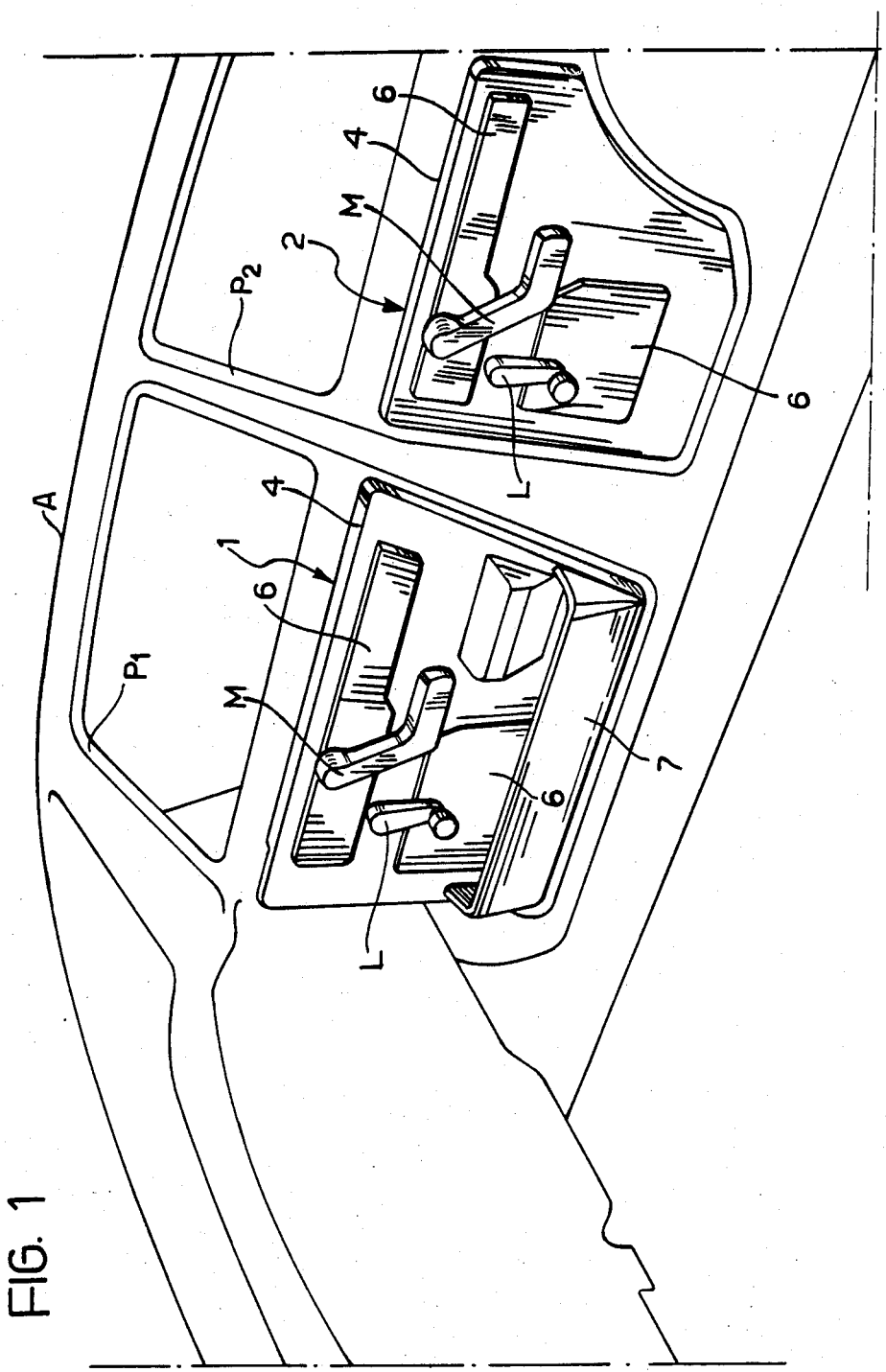
FIG. 1 is a schematic perspective view which shows the inside of a motor car provided with preformed trim elements according to the invention.
Figure 2:
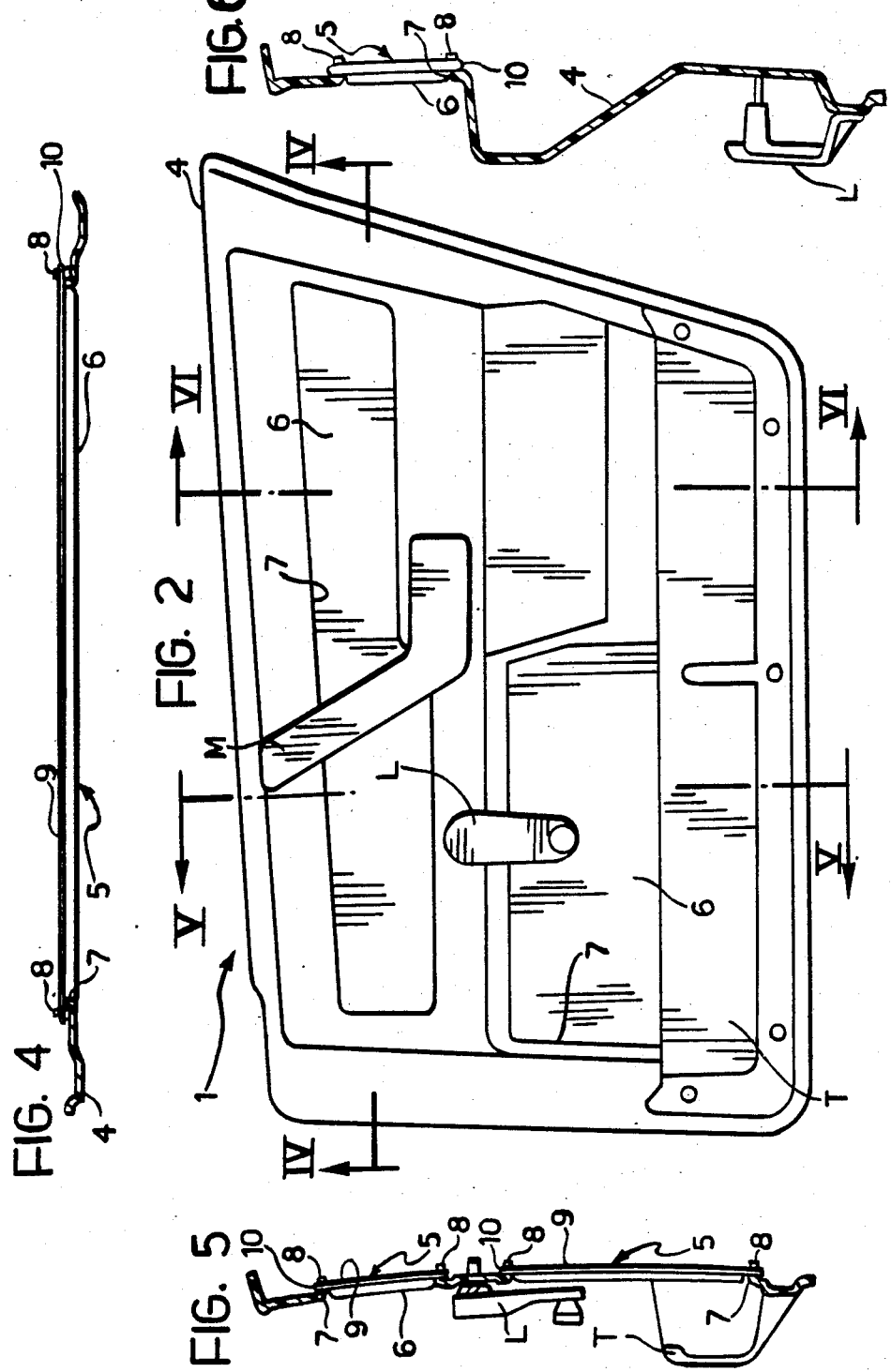
FIG. 2 is a front elevational view of one of the trim elements of FIG. 1, on an enlarged scale.
Figure 3:
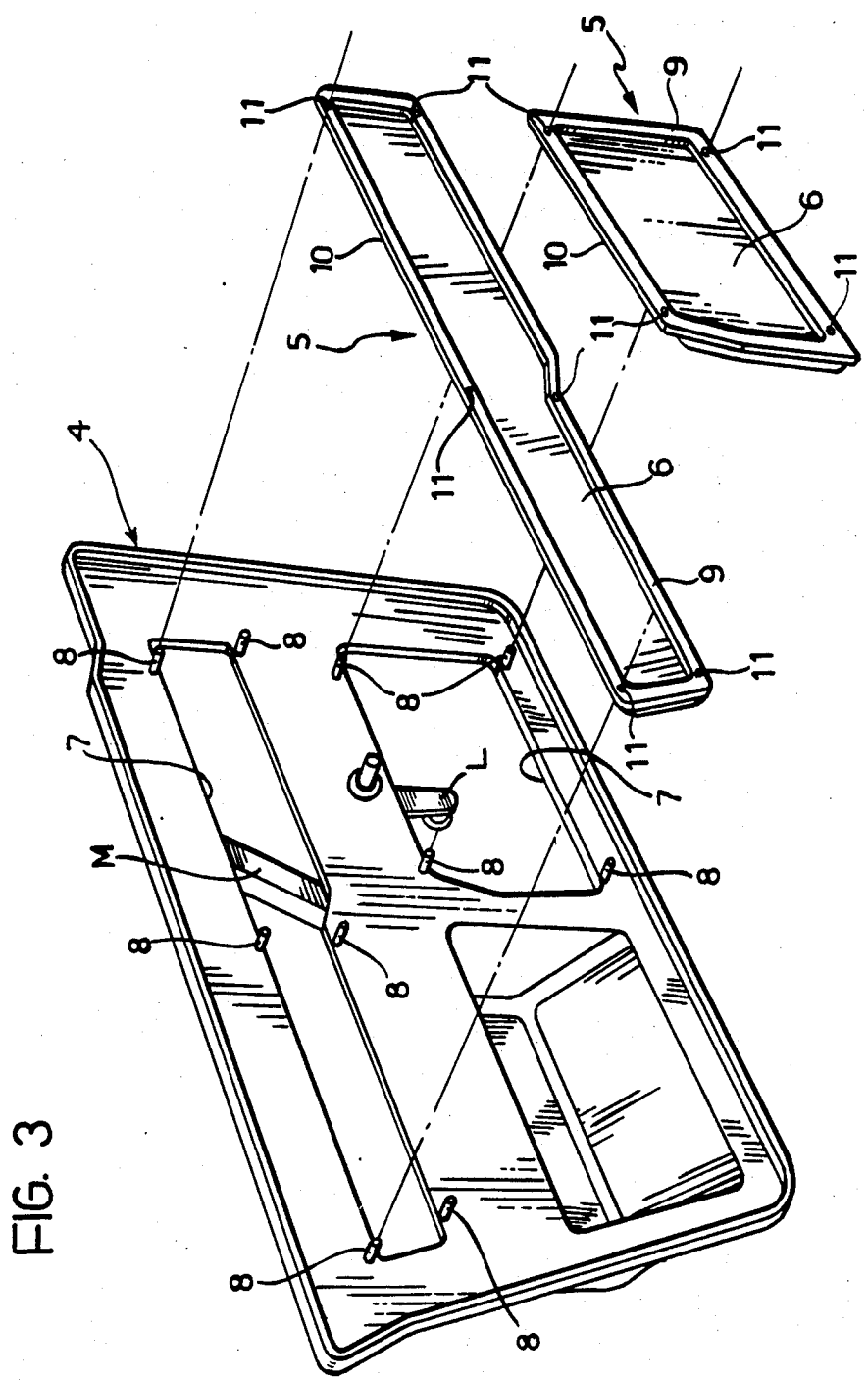
FIG. 3 is an exploded perspective view of FIG. 2.

With reference initially to FIG. 1, a part of the passenger compartment of a motor car equipped with preformed trim elements according to the invention is schematically indicated A. In particular, these elements comprise a panel 1 for covering the inside of one of the front doors $P_1$ of the car and a panel 2 covering the inside of one of the rear doors $P_2$ of the car.

The two elements 1 and 2 have different configurations but are produced by identical techniques and with identical components, as described below with reference to the element 1 illustrated in greater detail in FIGS. 2 to 6.

The element 1 is constituted essentially by a shaped base 4 and by a pair of flat panels 5 carrying respective soft coverings 6 and applied in correspondence with two regions circumscribed by the base 4.

The base 4 is made of thermoplastic material, for example of polypropylene, and is produced by an injection moulding method of a type known to the expert in the art.

This moulding is carried out so that, in correspondence with the regions intended to receive the flat panels 5, the sheet 4 has corresponding openings 7. Furthermore, still during moulding, integral projecting retaining appendages 8, whose function will become clear from the following, are formed on the inner face of the base 4, in correspondence with the edges of the opening 7.

Each flat panel 5 is constituted by a rigid substrate 9, normally of Masonite or a similar material, to one face of which the covering 6 is applied. The latter conveniently comprises a layer of soft material, such as wadding or the like, to which is heat-welded a layer of natural or synthetic fabric defining the covering 6 proper.

The arrangement is such that, between the outer edge of the cover 6 and that of the substrate 9, is defined a peripheral bearing flange 10 which has through-holes 11 arranged like the retaining appendages 8 of the corresponding opening 7.

The application of the panels 5 to the base 4 is effected by inserting the panels 5 from the rear of the back face of the base 4, in correspondence with the respective openings 7, and inserting the retaining appendages 8 through the holes 11 of the flanges 10. The flanges 10 are then pushed into contact with the edge of the respective openings 7, so as to position the coverings 6 through the openings.

Permanent fixing of the panels 5 to the base 4 is effected by simple hot deformation of the free ends of the retaining appendages 8 against the flanges 10.

The element 1 is then completed by the application of accessories, such as an armrest-handle M, the operating crank L for the window of the door P$_1$, and a possible lower pocket T for holding articles.

As stated above, the element 2 of FIG. 1 is produced in an identical manner to that described above with reference to the element 1, and differs from the latter only in the different shapes of the base 4 and of the panels 5 with the soft covering 6, and in the arrangement and configuration of the accessories.

Naturally, the details of construction and forms of embodiment may be varied widely with respect to those described and illustrated, without thereby departing from the scope of the present invention.

Thus, for example, the or each panel may be fixed to the base by gluing, welding or similar techniques suitable for ensuring the integrity of the preformed element.

I claim:

1. A preformed element for the interior trim of motor cars, which comprises a preformed base of thermoplastic material produced by injection moulding and having at least one opening and integral retaining appendages extending therefrom in the region adjacent said at least one opening, and at least one flat panel carrying a soft covering and including a peripherally extending flange thereabout, said flange including apertures corresponding in number and position for reception of said integral retaining appendages when said flat panel is applied to the back face of said base so as to be positioned in correspondence with said at least one opening, such that said retaining appendages extend through said correspondingly positioned apertures of said at least one flat panel, and thereby provide means for affixing said at least one flat panel to said flange.

2. An element according to claim 1, wherein said means for affixing said at least one panel by affixing the retaining appendages to said flange, is by hot deformation.

3. An element according to claim 2, wherein said at least one panel comprises a rigid substrate forming a peripheral flange for bearing against the edge of said at least one opening in engagement with the integral retaining appendages, and to which the covering is fixed so as to project through said at least one opening relative to the bearing flange.

4. An element according to claim 1, wherein said at least one panel is fixed to the base by a technique chosen from welding or gluing.

5. A method for the production of a preformed element for the interior trim of motor cars, which comprises the steps of:

forming a shaped base having at least one opening, by injection moulding of a thermoplastic material, producing at least one flat panel formed by a rigid substrate and by a soft covering applied to the substrate, fixing said at least one flat panel to the back face of the base in correspondence with said at least one opening so that the soft covering of said at least one flat panel is disposed within said at least one opening when said flat panel is positioned against the back face of said base, providing said base with integral retaining appendages projecting from the back face thereof in the region adjacent said at least one opening, providing said rigid substrate of said at least one panel with a peripheral flange, said flange having through-apertures positioned to correspond with the number and placement of said retaining appendages, such that said retaining appendages extend through said corresponding apertures, and affixing said at least one flat panel by affixing said retaining appendages to said flange by affixing means.

6. A method according to claim 5, wherein said peripheral flange is placed in bearing contact with the edge of said at least one opening and the step of affixing of said at least one flat panel to said base is by hot deformation of the retaining appendages against said flange.

7. A method according to claim 5, wherein said at least one panel is fixed to the base by a technique chosen from welding or gluing.

* * * * *